Sept. 22, 1964
R. E. HANNA ETAL
3,150,366
DISTANCE MEASURING SYSTEM
Filed May 12, 1960
4 Sheets-Sheet 1
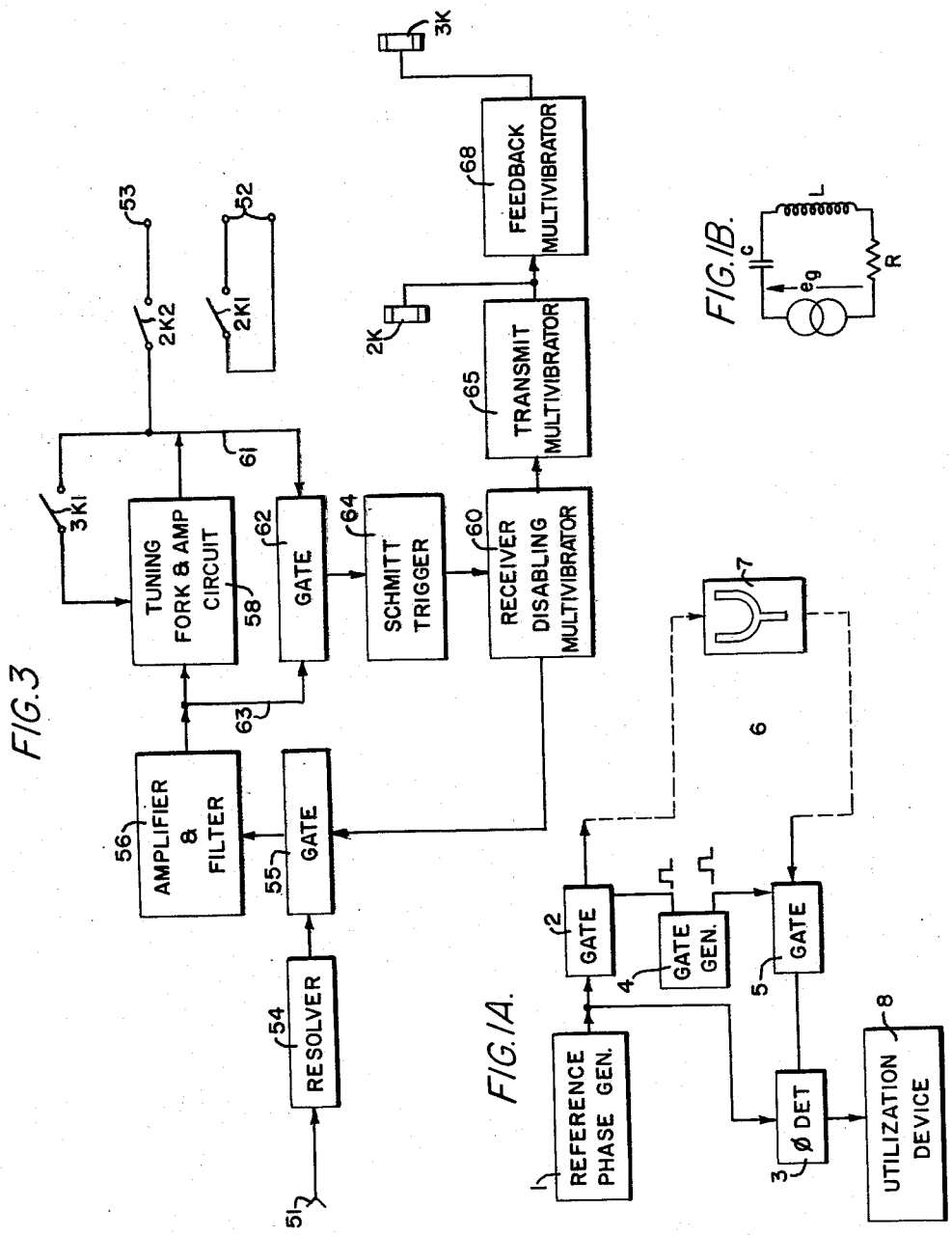
INVENTORS.
RAYMOND E. HANNA
JOHN G. KOENIGSMARK
BY
Robert T. Killman
ATTORNEY

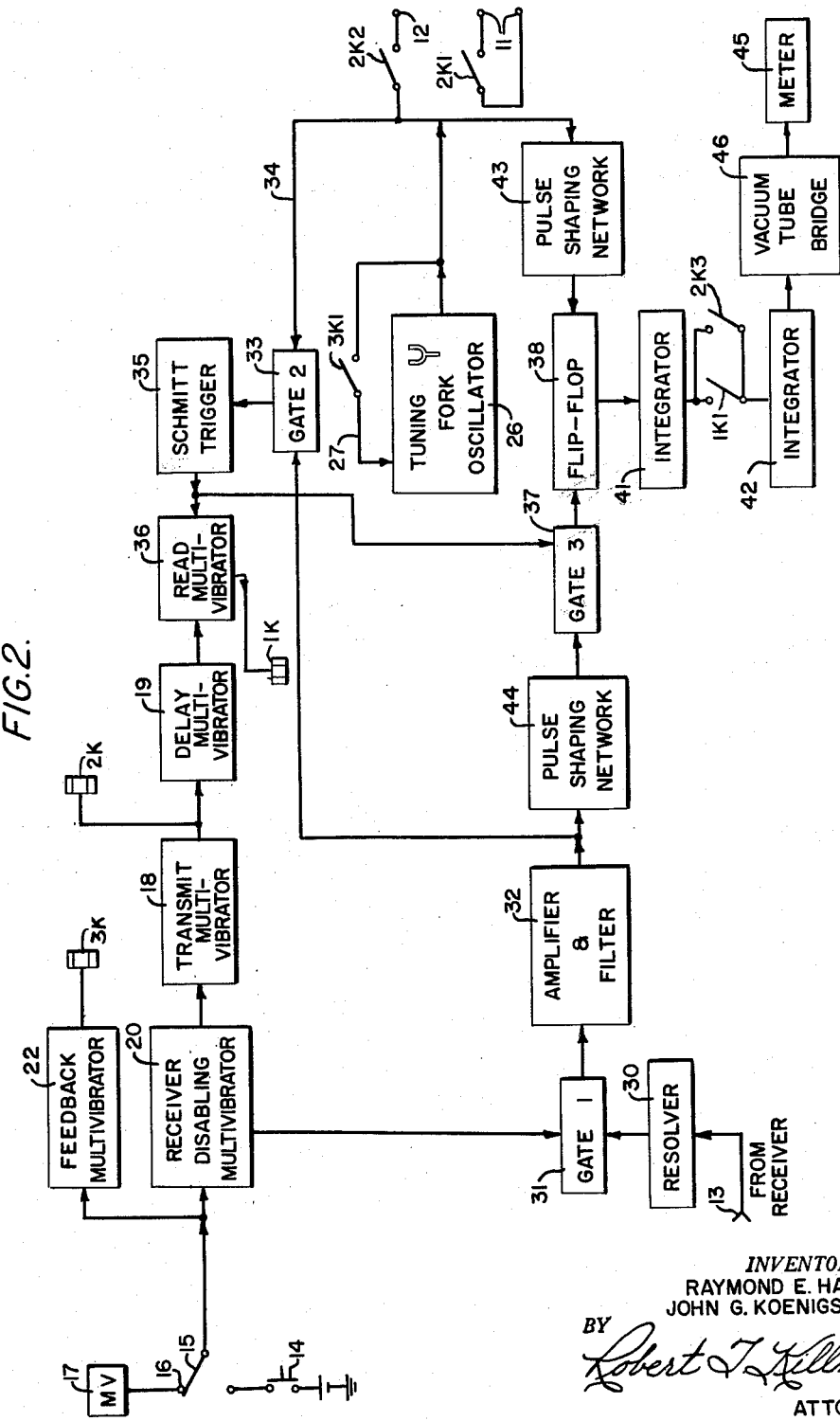

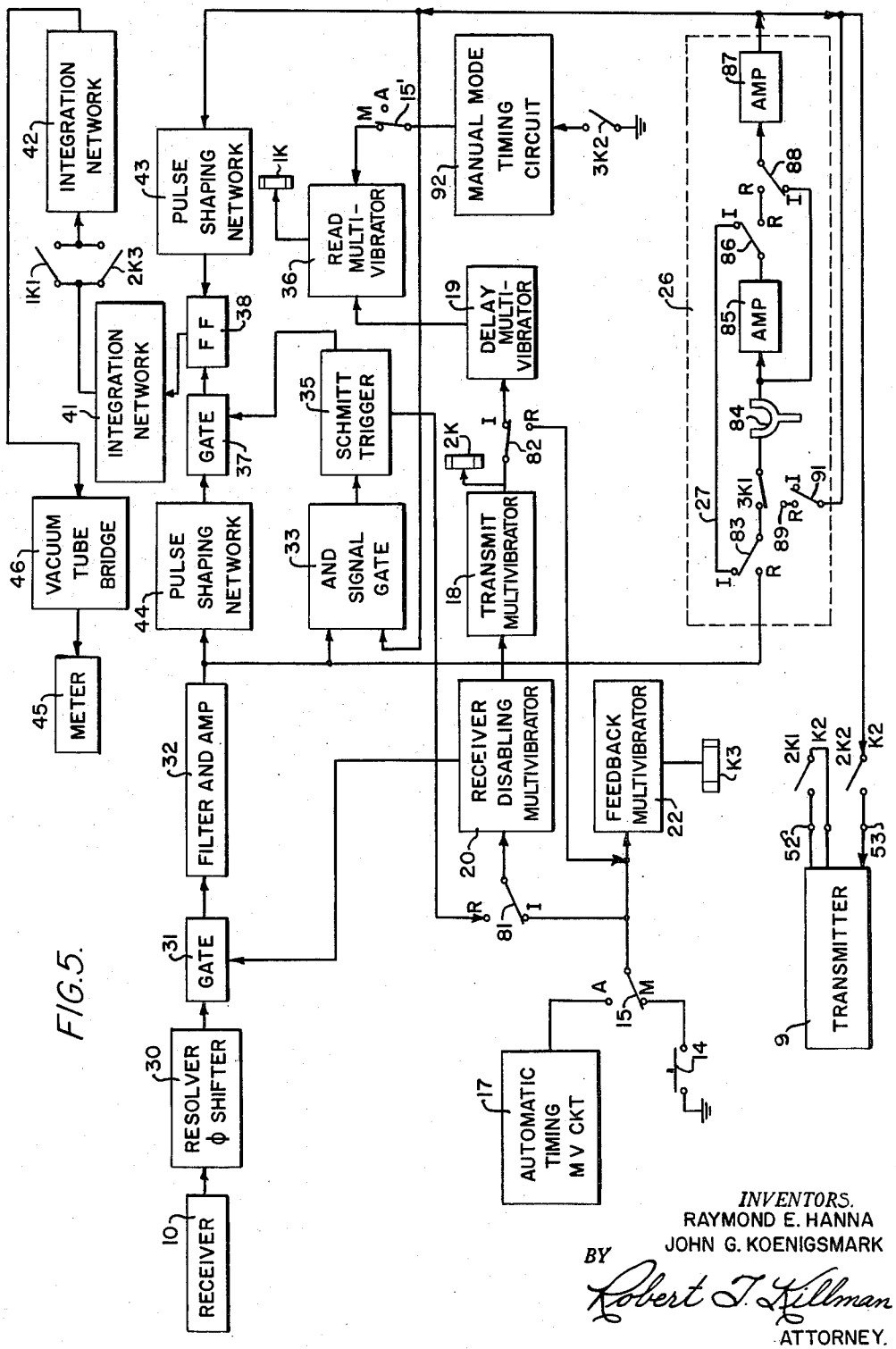

United States Patent Office 3,150,366
Patented Sept. 22, 1964

3,150,366
DISTANCE MEASURING SYSTEM
Raymond E. Hanna, Baltimore County, and John G. Koenigsmark, Lutherville, Md., assignors to The Bendix Corporation, Towson, Md., a corporation of Delaware
Filed May 12, 1960, Ser. No. 28,635
12 Claims. (Cl. 343—12)

This invention relates to phase memory systems generally, and more particularly to distance measuring equipment employing phase storage. More particularly the invention relates to distance measuring systems which can be operated as a simple adaptations of the normal communication transmitters and receivers generally found in aircraft. One aspect of the invention is particularly directed to improvements in systems of the type disclosed in the co-pending application of McIver et al. Serial Number 23,810 filed April 21, 1960 for "Distance Measuring System," a continuation of application Serial Number 734,566 filed May 12, 1958, now abandoned.

The aforementioned application discloses a distance measuring system in which a highly stable source of modulation frequency is employed to modulate an interrogating transmission and provide the phase reference for comparing the phase of the modulation of a response transmitted from a remote point. The phase memory at the remote point is established by a stable electromechanical resonator which is resonant at the modulation frequency and to which negative feedback is applied during the reception of the interrogation signal. The application of negative feedback to the resonator lowers its Q appreciably and permits it to accept the phase information contained in the received interrogation modulation applied thereto. When the received signal terminates, the negative feedback around the resonator is removed permitting the resonator to oscillate with a normal high-Q characteristic thereby preserving the phase information of the received signal. This oscillation of the resonator is then employed to modulate the transmitter of the responder for returning to the interrogation station a modulation signal which differs in phase from the reference modulation at the interrogation station only due to the distance of the transmission path between the two stations. Thus at the interrogation station distance can be indicated by utilizing the phase comparison of the two signals.

An object of the present invention is to provide improved systems capable of phase storage using high Q resonators.

Further objects of the present invention are to provide in a system of the aforementioned type simplification in the equipment and operating mode which achieve improved reliability and greater economy while at the same time providing improved performance. The preferred embodiment of the present invention features electromechanical resonators at the interrogator and responder locations which are permitted to operate as freely oscillating structures during the interval in which signal information is extracted therefrom. In addition at the responder station the phase information is applied to the resonator as a direct driving energy without the necessity for reducing the Q of the resonator. This direct drive of the resonator is accomplished with preservation of the phase information for free transmission back to the interrogation station. At the end of the retransmission interval the resonator at the responder station is damped to permit it to be in a condition to accept the driving signal at the next interrogation.

The foregoing objects and features of the invention are achieved and will be more apparent from an understanding of the disclosed preferred embodiment thereof reference being had to the following detailed description taken in conjunction with the accompanying drawings wherein:

FIG. 1A is a block diagram of a generalized system in accordance with the invention;

FIG. 1B is an equivalent circuit of a resonator useful in explaining the invention;

FIG. 2 is a block diagram of an interrogation station in accordance with the invention;

FIG. 3 is a block diagram of a responder station in accordance with the invention;

FIG. 5 is a block diagram of combined interrogator and responder equipment showing the switching arrangement which enables a single station to accomplish both interrogating and responding functions and utilize certain components common to each mode of operation.

Figure 4A:
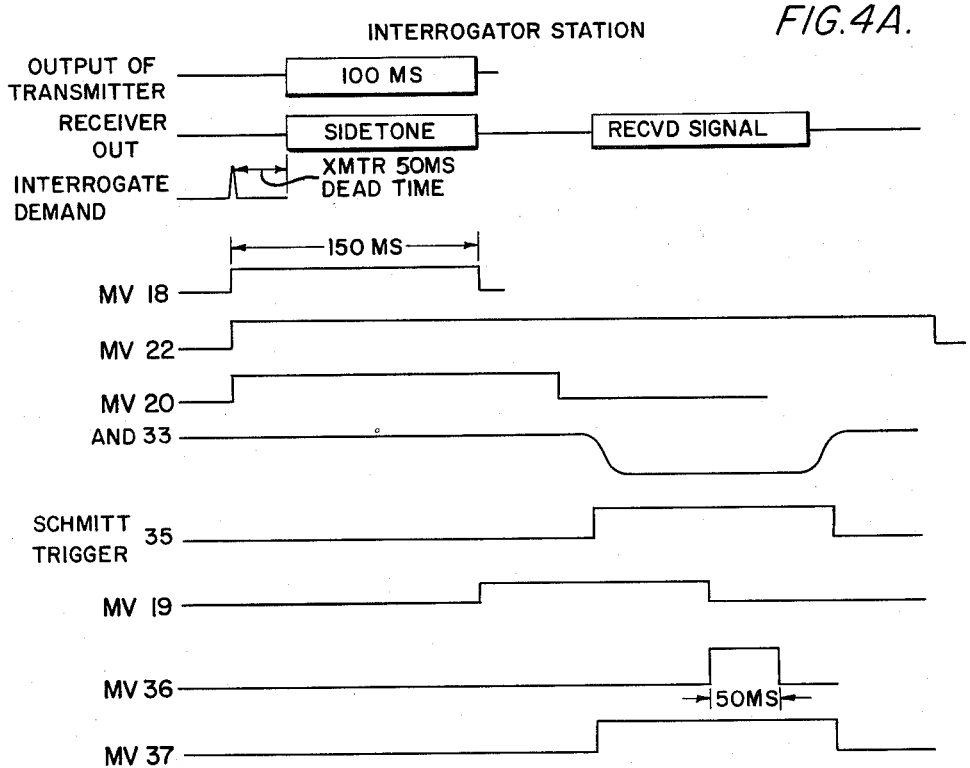
FIG. 4A is a waveform diagram for interrogation operation of the invention.

The system of FIG. 1A shows a generalized system utilizing the principles of the present invention to accomplish phase storage and readout to a phase detector and ultimate utilization of the phase information. The system comprises a reference phase generator 1 which generates a stable sinusoidal waveform which is applied to a transmitting gate 2 and a phase detector 3. The transmitting gate 2 is controlled by a gate generator 4 which supplies time-adjacent gating waves to the gate 2 and a receiving gate 5. The signal passed by the gate 2 is transmitted via a physical or space data link 6 to a resonant storage device 7 which returns to gate 5 a wave which contains the phase information stored in the resonant system 7. The signal received by the gate 5 is applied as the second input to the phase detector 3 and the difference in phase between the two inputs applied to the phase detector 3 produces an output proportional to the phase difference to a utilization device 8. The systems in accordance with the present invention are capable of accurate phase comparison utilizing a resonant system 7 by virtue of the timing relation for controlling the signals applied to and extracted therefrom as can be understood from the following discussion in relation to FIG. 1B.

The phase performance of a resonant system can be described from the equivalent circuit of FIG. 1B in which a generator potential $e_g$ having the angular frequency $\omega_g$ is connected to a resonant circuit having a similar natural angular frequency $\omega_0$ and a very high $$Q = \frac{\omega_0 L}{R}$$

When the generator is excited, current will flow having components in phase and in quadrature with the generator voltage. The former represents energy lost by the generator and stored in the resonant system, eventually to be dissipated in R, and initially is the dominant component. The eventual steady state conditions are well known and are adequately shown for small frequency deviations in many texts, one of the simplest being chapter 3 of "Radio Engineering" first edition, by F. E. Terman. However, when the generator is excited for a period which is very short compared to the time constant T of the resonant circuit $$\left(t<<T=\frac{L}{R}\right)$$

a substantially constant increment of current is produced in the resonant system during each oscillation of $e_g$ and each such increment raises the stored energy to a level proportional to the square of the numerical order of the cycle. Each such increment of stored energy continues to oscillate at the frequency of the resonant system, rather than the frequency of the generator.

Considering a numerical example of the disclosed preferred embodiment, the resonant system is actually a tuning fork equivalent to the electrical circuit having an angular frequency of $1500\pi$ and a Q of the order of $10^4$, which makes the time constant $$T=\frac{L}{R}=\frac{1}{RC}=\frac{Q}{\omega}=2.1$$

seconds. If this fork is excited for a period of 0.1 second, the amplitude of the fork vibration can be raised from zero to almost 5% of the equilibrium amplitude for the driving conditions, this portion of the rise in amplitude being a nearly linear segment of what is really the well-known exponential rise to an asymptote at the ultimate steady-state amplitude. During this driving period of 0.1 second, energy is transferred to the fork at an increasing rate so that half the energy is stored in the first 0.07 second, the other half in the remaining 0.03 second and the phase of the oscillation relative to the generator is that which it would have if all the energy had been stored at the time $$t\left(1-\frac{1}{e}\right)=0.63t$$

or in this instance 0.063 second after the beginning of the driving period. Practical moderately priced tuning forks are available having a frequency tolerance of ±.01%, or approximately 0.5 radian/second in this instance. Thus, if a fork at one limit of this frequency tolerance is used with an amplifier to drive another fork at the other limit of this tolerance, a phase departure of 0.037 radian will accumulate during the driving period of 0.1 second as compared to the phase relation between two perfectly synchronous forks of the frequency specified above.

During the next 0.1 second interval in which readout of phase information is accomplished with the driving amplifier cut off, a further phase departure of 0.1 radian will occur so that the total phase departure will be 0.137 radian at the end of this interval and the average value of phase departure during this second interval will be 0.087 radian. This compares to a phase departure of 1.3 radians in prior art systems using similar forks if one fork were used with an appropriate amplifier to drive the others as a band pass filter under steady-state conditions or about fifteen times the average value for the post-driving interval given above. In the present invention the most probable error between any pair of these tuning forks would give a phase departure of 0.02 radian averaged over the 0.1 second interval following a 0.1 second driving interval while for the steady state drive of the prior art the error would be 0.73 radian, an advantage of 37 times over the previously known art using steady-state conditions. The improvement may be made still greater by choosing a shorter driving interval and perhaps a shorter second interval for phase comparison, since the accumulation of phase departure is directly proportional to the time intervals.

When used as the storage device in a distance measuring equipment the tuning forks of the above practical example will introduce a maximum error of about 2½ miles for the combination of two forks oppositely disposed at the extreme limits of tolerance and the most probable error will be less than 0.4 mile. Much of this error can be avoided by a calibration introducing a standardizing phase shift in each transponding circuit to bring it into accord with a very precise frequency standard under the conditions of short range response.

Referring now to FIG. 2 an interrogator accessory for a conventional communication radio is shown with terminals 11 connected to key the radio transmitter ON and terminal 12 connected to the modulation input of the transmitter whereby the radio transmitter will be modulated with the signal applied from terminal 12 and transmit a modulated signal upon energization of a relay to close contacts 2K1, 2K2. The receiver of the communication radio set supplies the detected modulation from the receiver to a terminal 13. With these connections and with the arrangement of the equipment as shown in FIG. 1 the station is adapted to interrogate a remote responder and indicate the distance thereto.

Interrogations may be initiated by means of a manual switch 14 or may be repeated continuously by connection of a switch 15 to contact 16. A continuously running multivibrator 17 supplies periodic triggering pulses to contact 16. The interrogate demand pulses on switch 15 trigger receiver disabling single-shot multivibrator 20 and feedback single-shot multivibrator 22. A single-shot multivibrator 18 is triggered by single-shot multivibrator 20 to produce a one hundred fifty millisecond wave the trailing edge of which triggers a delay single-shot multivibrator 19. An output obtained from the end of the pulse of the delay multivibrator 19 is applied to a read single-shot multivibrator 36. The demand interrogate signal applied to multivibrator 20 is also applied to the feedback multivibrator 22 the output of which is a wave of 500 millisecond duration used for energizing a relay 3K to be hereinafter described.

The output of the transmit multivibrator 18 is applied to a relay 2K which is thereby energized for a period of 150 milliseconds to close transmitter contacts 2K1 and modulator input contacts 2K2. The modulator contacts 2K2 supply to terminal 12 a signal from a tuning fork oscillator 26 which is made up of amplifying stages driving, through a normally closed positive feedback path 27, a tuning fork or other electro-mechanical resonator of precise frequency and high phase stability. One suitable commercial version of the tuning fork resonator is the Philamon Company tuning fork Model MJ-750-S(526A). This particular fork has a natural period of oscillation of 750 cycles per second with an accuracy of plus or minus 100 p.p.m. The tuning fork oscillator 26 normally oscillates by virtue of the high gain loop provided by the amplifiers and the positive feedback to the tuning fork provided by the feedback path 27. The path 27 includes contacts 3K1 which are opened by the feedback multivibrator 22 energizing relay 3K thereby opening contacts 3K1 and interrupting the positive feedback path 27 coincidentally with the initiation of transmission. Thus during transmission by the radio transmitter of the system the modulation to the transmitter supplied from terminal 12 via contacts 2K2 is that obtained from the freely vibrating tuning fork of oscillator 26 without any electrical drive signal whatsoever. The Q of tuning forks of this nature is sufficiently high so that the modulation signal will be maintained at substantially constant amplitude during the 500 millisecond period of multivibrator 22 during which feedback path 27 is open.

At the end of the transmission interval of 150 milliseconds determined by multivibrator 18, the system will await a response from a responder station the detected modulation of which is applied to terminal 13 and passes through a resolver phase shifter 30, a gate 31 and a 750 c.p.s. filter and amplifier 32. The received signal from the amplifier 32 is applied to AND gate 33 which has a second input from the tuning fork oscillator 26 applied on lead 34. The coincidence of received signals and locally generated tuning fork signals in gate 33 produces an output to a Schmitt trigger 35. The Schmitt trigger produces an output as long as the received signal from gate 33 is above a predetermined level and during this interval supplies an enabling voltage to read multivibrator 36 and gate 37. The end of the pulse from the delay multivibrator 19, triggers the enabled read multivibrator 36 to produce an output signal of 50 milliseconds duration within the enabled period during which gate 37 passes signals from a pulse shaping network 44 to a flip-flop phase comparator 38. The multivibrator 36 energizes a relay 1K which closes contacts 1K1 connecting the output of a first integrator 41 to the input of a second integrator 42.

The flip-flop phase comparator 38 is supplied with two inputs which alternate the conductive state of the flip-flop 38. One of the input signals is passed by the gate 37 as previously described and the other is derived from the tuning fork oscillator 26. In each instance the source of the signals to be applied to the flip-flop 38 is a substantially sinusoidal wave and for the purpose of obtaining accurate phase comparison the sinusoidal wave is clipped and shaped to produce accurate timing pulses representative of a predetermined point in the cycle of each wave from the sinusoidal source. For this purpose the output of the tuning fork oscillator 26 is applied to a pulse shaping network 43 and the timing pulses produced thereby are applied as the second input to the flip-flop 38. In similar manner the received modulation signal in amplifier 32 is passed through pulse shaping network 44 to provide accurate timing pulses as the input to gate 37 to be passed during the enabled interval thereof to the other input of flip-flop 38. The integrators 41 and 42 thus develop a voltage which is proportional to the relative duration of the two states of flip-flop 38.

The flip-flop phase comparator 38, during the period when the gate 37 is not enabled by the Schmitt trigger 35, maintains a constant voltage input to integrator 41 which acts as an erase signal. This normal state of the flip-flop 38 is assured by the pulses received from network 43 and the absence of pulses passing through gate 37. The integrators 41 and 42 thus receive a voltage which erases the reading on distance indicator 45. This erase signal is obtained by a contact 2K3 paralleling contact 1K1 and operating by relay 2K during the interrogation interval.

The metering circuit between integrator 42 and indicator 45 comprises a vacuum tube bridge 46 which produces a conventional vacuum tube voltmeter measurement on indicator 45 of the voltage accumulated in integrator 42. Upon the opening of switch 1K1 the voltage on integrator 42 is maintained for a predetermined interval until erase to permit the indication to be observed on the indicator 45.

For the interval of 50 milliseconds after the end of the pulse from delay multivibrator 19 the switch 1K1 remains closed and the metering function can be performed by integrators 41, 42 with indicating meter 45, showing on a suitably calibrated scale the distance proportional to the phase difference between the signals applied to the comparator 38. At the end of this 50 milliseconds the switch 1K1 opens and the meter 45 maintains its reading due to the action of integrator 42 and vacuum tube bridge 46. At the end of 500 milliseconds the switch 3K1 closes re-establishing the positive feedback path 27 and permitting the tuning fork oscillator 26 to sustain oscillations until the next interrogation demand is initiated by switch 14 or an impulse from multivibrator 17.

Referring now to FIG. 3 a responder station is shown in which a terminal 51 receives demodulated signals from a radio receiver tuned to the interrogating station.

The responder station is also provided with a transmitter the key terminals of which are connected to terminals 52 and the modulation input to the transmiter is supplied from terminal 53. The demodulation signal applied at terminal 51 is passed through a resolver phase shifter 54, a gate 55, and a 750 c.p.s. filter and audio amplifier 56. The signal from amplifier 56 is applied to drive a tuning fork resonator 58. The received demodulation signal at terminal 51 is applied to tuning fork 58 for approximately 100 milliseconds corresponding to the interrogation transmission interval and drives the tuning fork 58 to a sufficient amplitude to serve subsequently as a modulation source. Once the applied signal ceases the fork 58 vibrates freely with very little phase deviation from the applied oscillations. Thus at the end of the interrogation transmission interval of 100 milliseconds the tuning fork 58 is freely oscillating with a frequency and phase substantially corresponding to that with which it was driven. The oscillation will be maintained for a substantial period of time due to the high Q of the tuning fork. The fork 58 is preferably substantially identical with that used for the interrogation modulation signal generation, although different type resonators having substantially identical frequency characteristics could be employed.

The output signal from the tuning fork 58 is amplified and applied to switch 2K2 which when closed connects the tuning fork signal to terminal 53 to modulate the transmitter at the responder station. The signal from tuning fork 58 is also applied on line 61 to gate 62 to which the demodulated signal from amplifier 56 is applied on line 63. After the signal from amplifier 58 has driven the tuning fork to sufficient amplitude, the simultaneous occurrence of signals on line 61 and 63 enables the gate 62 to produce an output which actuates a Schmitt trigger 64. When the input on line 63 to gate 62 terminates the output of the gate 62 drops causing trigger 64 to fall which triggers a receiver disabling single-shot multivibrator 60 and a transmit single-shot multivibrator 65. Multivibrator 60 disables gate 55 to prevent passage of signals developed in the receiver during the responder transmission interval. Multivibrator 65 produces an output of duration of 250 milliseconds and during this interval energizes a relay 2K thus closing switches 2K1 and 2K2. The transmitter keying circuit is thereby completed through terminals 52 and modulation from the tuning fork 58 is applied to the transmitter modulation input terminal 53. Thus for an interval of approximately 250 milliseconds the transmitter of the responder station is energized and modulated with the modulation from the tuning fork 58.

At the end of the responder transmission interval the multivibrator 65 produces a negative going wave which triggers a feedback single-shot multivibrator 68. The multivibrator 68 produces an output pulse of 500 milliseconds during which a relay 3K is energized to close contact 3K1 which is connected to the output of tuning fork circuit 58. The loop formed around tuning fork 58 by the closure of contact 3K1 includes amplification and is of phase to constitute negative feedback thereby applying severe damping to the vibrations of the tuning fork 58. By this means at the end of the pulse interval of multivibrator 68 the tuning fork 58 has been damped sufficiently to be ready to receive a driving impulse from the next interrogation signal arriving at terminal 51 and passed to the tuning fork from audio amplifier 56.

Figure 4B:
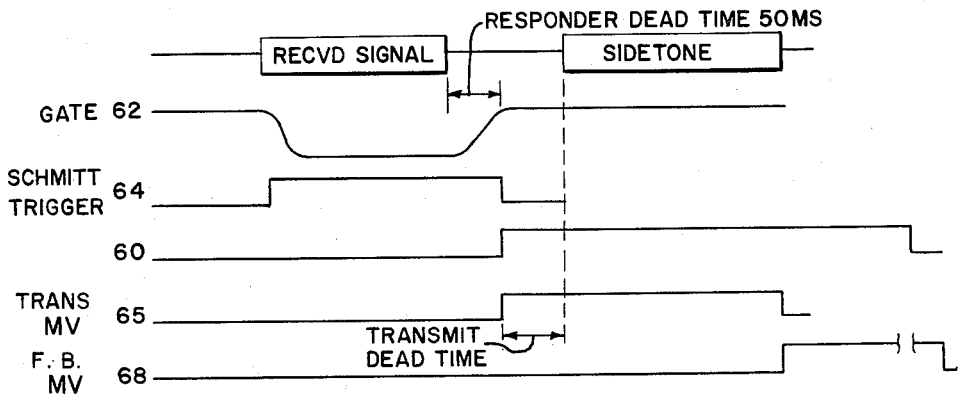
FIG. 4B is a waveform diagram for responder operation of the invention.

Referring to FIGS. 4A and 4B the operation of the system will now be described. An interrogation is initiated by triggering multivibrator 18. The transmitter may have a 50 millisecond build-up time after which a 100 millisecond transmission occurs corresponding to the remainder of the pulse interval of multivibrator 18. This transmission is modulated by the freely vibrating tuning fork in oscillator 26 after multivibrator 22 has opened contacts 3K1 to interrupt feedback circuit 27 and contacts 2K2 close to apply the modulation signal to terminal 53. The transmitted signal is received (FIG. 4B) by the responder station and is utilized to drive tuning fork 58. At the end of the reception at the responder station, the end of the pulse generated by Schmitt trigger 64 triggers receiver disabling multivibrator 60 and at the same time triggers transmit multivibrator 65 for a duration of 150 milliseconds. After about 50 ms. dead time the modulation of tuning fork 58 is transmitted back to the interrogation station. The multivibrator 60 disables gate 55 to keep the responder sidetone out of the amplifier 56.

At the interrogation station the received signal (FIG. 4A) from the responder and the signal from oscillator 26 actuate AND gate 33 to produce in Schmitt trigger 35 an enabling pulse for a coincidence gate 37. The delayed trigger at the end of the pulse of single-shot multivibrator 19 actuates the read multivibrator 36 to produce a pulse for an interval of 50 milliseconds. During this pulse from multivibrator 36 relay 1K is energized and the meter circuit 40 measures the output of the phase comparator 39. At the end of reception at the interrogation station the Schmitt trigger 35 disables gate 37 and at the end of 500 milliseconds the multivibrator 22 reapplies positive feedback to tuning fork oscillator 26 maintaining its oscillation until the next interrogation is initiated. At the end of the pulse of multivibrator 65 in the responder, the responder transmission is interrupted by deenergizing relay 2K and the feedback multivibrator 68 applies negative feedback to the tuning fork 58 for 500 milliseconds. Thus a complete cycle of distance measuring transponding is completed.

Since the interrogation station and the responder station utilize a number of similar components a single unit may be constructed which share the similar components. By suitable switching the unit may be adapted to be either an interrogator or responder station. In FIG. 5 a block diagram of the switching arrangement among the components to adapt a single unit for this purpose is shown.

The components in FIG. 5 are designated with the reference numerals used in describing the interrogation station of FIG. 2 insofar as the numerals apply to the same equipment. The complete transponder station may operate with respect to a simplex transmitter 9 and a corresponding receiver 10. The transmitter is connected through the modulation switch 2K2, actuated by relay 2K, to the output of the tuning fork oscillator 26. The relay 2K also actuates the switch 2K1 for keying the transmitter 9. The various switches required to change the equipment from an interrogation station to a responder station are shown in FIG. 5, with contacts labeled "I" connected as shown to represent the position of the switches for an interrogation operation.

The interrogation station operates as previously described from the impulses received either from the multivibrator 17 or manual push button switch 14 as selected by the automatic-manual switch 15. The demand pulse is supplied to the feedback multivibrator 22 and through switch 81 to the receiver disabling multivibrator 20 the output of which is applied to the gate 31 and to the transmit multivibrator 18. Multivibrator 18 operates relay 2K and through switch 82 the delay multivibrator 19. The output of multivibrator 19 is applied to the read relay multivibrator 36. The read relay multivibrator 36 energizes relay 1K. The enabling pulse to the gate 37 is obtained from the Schmitt trigger 35 which is operated by the output of the AND gate 33 which receives inputs from the tuning fork circuit 26 and the output of the filter and amplifier 32. When enabled AND gate 33 passes signals from amplifier 32. As previously described, input signal to the filter and amplifier circuit 32 is obtained from the receiver 10 the detected output of which passes through the resolver 30 and input gate 31.

The signals passed through the enabled gate 37 are the shaped pulses produced by shaping in network 44 the output of the filter and amplifier 32 to supply one input of the flip-flop 38. The other input to the flip-flop 38 is the pulse train derived from the output of the tuning fork circuit 26 after suitable shaping in pulse shaping network 43. The metering circuit includes first integrating network 41 which is connected through switches 1K1 and 2K3 to a second integrating network 42, the vacuum tube bridge 46 and meter 45. As previously stated switch 1K1 is operated by relay 1K and switch 2K3 is operated by relay 2K.

The tuning fork circuit 26 is provided with a switch 83 which in the interrogate position completes the positive feedback connection around a tuning fork 84 for driving the fork as the frequency stabilizing element in an oscillator. For this purpose the fork 84 is connected to an amplifier 85 the output of which is applied through a switch 86 to the positive feedback loop 27. The positive feedback loop is completed through switches 86, 83 and 3K1 except for intervals when the relay 3K is energized. For the interrogate mode the output of the tuning fork circuit 26 is derived from an amplifier 87 connected through switch 88 to be supplied from the output of the tuning fork 84. When relay 3K is energized the switch 3K1 supplies the negative feedback connection around the tuning fork 84 through contact 89. In the interrogate mode a switch 91 interrupts this negative feedback circuit.

When the switch 15 is connected to the lower contact for operation of the interrogator by push button control an erase circuit 92 is operated by relay 3K closing contacts 3K2. The erase circuit 92 is connected during manual mode operation by switch 15′ (ganged with the manual-automatic selector switch 15) to trigger read multivibrator 36. The circuit 92 initiates a 5 second delay from the time a manual interrogation demand energizes relay 3K and closes contact 3K2. Five seconds after contacts 3K2 close the circuit 92 triggers read multivibrator 36 to again close contacts 2K3 and apply the erase voltage derived from the quiescent state of flip-flop 38.

When the equipment of FIG. 5 is used as a responder the switches 81, 82, 83, 86, 88 and 91 are all switched to the R contact for which position the portions of the circuit generally correspond with those of FIG. 3. Thus the feedback single-shot multivibrator 22 is actuated by the output of the transmit single-shot multivibrator 18 and the receiver disabling single-shot multivibrator 20 is actuated by the output of Schmitt trigger 35. The output of the filter and amplifier 32 is applied through switch 83 to drive the tuning fork 84. The amplified output of the tuning fork 84 passes from amplifier 85 through switches 86 and 88 is further amplified in amplifier 87 thence to the transmitter modulation input 53 through switch 2K2. AND gate 33 also receives the output signal from amplifier 32. At the end of a transponding cycle the energization of relay 3K moves switch 3K1 to contact 89 and with switch 91 against R contact, the negative feedback path around the tuning fork 84 provides the necessary damping of the fork before the next interrogation signal is received.

In operation of the equipment of the present invention an interrogation will be initiated a known distance from a responder station. The resolver 30 at the interrogator will be adjusted to produce a reading on indicator 45 equal to the known distance. The system is then calibrated for all distances within its operating range. Two systems of the combined interrogator-responder type as shown in FIG. 5 when so calibrated against a responder of the same fixed interval delay can then operate with respect to each other without further calibration. Thus the equipment of FIG. 5 can be used in aircraft to determine distance from ground stations or from other aircraft so equipped.

The accuracy of the systems in accordance with the present invention is enhanced by the absence of feedback, either positive or negative, when phase information is stored or extracted from the tuning fork resonators. Feedback of either sign will alter the resonant frequency of a resonator and its absence in both interrogate and respond modes as herein described allows the fork to oscillate at the same frequency for each mode. Under these conditions the frequencies of individual equipments are all closer to standard frequency since they are determined by the fork alone and are not influenced by variations in supply voltages or gain of the circuits associated with the fork.

While preferred embodiments of the present invention have been disclosed it will be apparent that many modifications of the inventive concept may be made. The invention, therefore, is to be limited only by the scope of the appended claims.

We claim:

1. A system for measuring distance between a first point and a second point comprising at said first point a first stable high-Q electromechanical resonator, a normally operative oscillation circuit including a positive feedback path driving said resonator at its resonant frequency and having said resonator determine the frequency of oscillation of said circuit, a transmitter, means for interrupting said feedback path and modulating with the free oscillations of said resonator the carrier of said transmitter, means for transmitting the modulated carrier from said transmitter, means at said second point for receiving said carrier and detecting the modulation thereof, a second stable high-Q electromechanical resonator at said second point having the same resonant frequency as said first resonator, means for driving said second resonator with said detected modulation, means at said second point for transmitting to said first point a signal modulated by the frequency of said second resonator, a receiver at said first point for receiving the signal transmitted from said second point and recovering the modulation component thereof, phase comparing means for producing an output signal in accordance with the phase difference between said modulation component and said free oscillations of said first resonator, and means responsive to said output signal for indicating distance between said first and second points.

2. Apparatus according to claim 1 with additionally means at said second point operative a predetermined time interval after the end of reception of modulation from said first point for damping the oscillations of said second resonator.

3. Apparatus according to claim 1 with additionally, tuning means for tuning all of said transmitters and receivers to the same carrier frequency, means at said first point rendering said transmitting means located there operative for a first period, and means at said second point rendering said transmitting means located there operative for a predetermined period separated from said first period by a predetermined interval.

4. An interrogator for a distance measuring system comprising an audio modulation tone oscillator having the frequency of said tone determined by a high-Q electromechanical resonator, a positive feedback loop for said oscillator, a transmitter, means for modulating said transmitter by said tone, selective means for concurrently operating said transmitter and opening said loop to transmit for a first interval the tone modulation produced by the free oscillation of said resonator, a receiver, a phase comparator, means for indicating distance in response to the phase difference determined by said phase comparator, means responsive to the end of said first interval for introducing a delay of a second interval, means responsive to the end of said second interval for actuating for a third interval said receiver, said comparator and said indicator, said comparator comparing the phase of modulation detected by said receiver with the phase of the tone derived from the free oscillations of said resonator to produce an indication of the distance to a responder station to which said transmitter and receiver are tuned and means for closing said feedback loop after said third interval.

5. Apparatus according to claim 4 in which tuning means are included for adjusting said transmitter and said receiver to operate on the same carrier frequency.

6. A distance measuring equipment selectively operable as an interrogator or responder comprising an audio modulation tone oscillator having a frequency determined by a high-Q electromechanical resonator, a positive feedback loop for said oscillator, a transmitter, means for modulating said transmitter by said tone, first selective means operable for opening said feedback loop and operating said transmitter to transmit for a first interval said tone modulation derived from the free oscillation of said resonator, a receiver, a phase comparator, means for indicating distance in response to the phase difference determined by said phase comparator, means responsive to the end of said first interval for introducing a delay of a second interval, means responsive to the end of said second interval for actuating for a third interval said receiver, said comparator and said indicator, said comparator comparing the phase of modulation detected by said receiver with the phase of the tone derived from the free oscillation of said resonator to produce an indication of the distance to a responder station to which said transmitter and receiver are tuned, means for closing said feedback loop after said third interval, second selective means operable to maintain said feedback loop open and to excite said resonator with the modulation detected by said receiver, means responsive to the termination of the detected output of said receiver when applied to excite said resonator for modulating said transmitter by the free audio oscillations of said resonator and transmitting said oscillations for a predetermined period, and means for damping said resonator after said period for a second predetermined period.

7. Apparatus according to claim 6 in which tuning means are included for adjusting said transmitter and receiver to operate on the same carrier frequency and said resonator maintains the same audio frequency for all oscillating conditions of operation of said equipment.

8. Apparatus according to claim 6 in which said resonator is tuning fork having a Q of the order of 10,000 or greater.

9. Apparatus according to claim 6 with additionally, adjustable phase shift means to which the output of said receiver is applied for calibrating said equipment with respect to phase shifts inherent in the system.

10. A responder for a distance measuring system, comprising a receiver, providing an audio output derived from an audio modulated interrogation signal, a high-Q electromechanical resonator resonant at the audio frequency of said interrogation signal, means for amplifying said receiver output and converting the same to forces for driving said resonator in synchronism, said forces being applied only during continuance of said receiver output whereafter said resonator mechanically oscillates freely, means for converting the free mechanical oscillations of said resonator into electrical signals, a transmitter including a modulator, means responsive to the termination of said receiver output for applying said electrical signals from said resonator to said modulator, means also responsive to the termination of said receiver output for keying said transmitter for a predetermined period and means for applying damping forces to said resonator at the expiration of said period.

11. Apparatus as claimed in claim 10 with additionally, means for tuning said transmitter and said receiver to the same carrier frequency.

12. A responder for a distance measuring system comprising a radio receiver providing an audio output, a low-loss high-Q electromechanical resonator tuned to the audio output of said receiver, a circuit coupling the output of said receiver to said resonator in its high-Q condition during a first period of time to cause said resonator to oscillate in synchronism with the output of said receiver, a transmitter, a modulator for said transmitter, switching means for applying free oscillations of said resonator to said modulator for a second fixed period of time, means responsive to termination of said receiver output for actuating said switching means, and means responsive to the cessation of actuation of said switching means for applying damping to said resonator.

References Cited in the file of this patent

UNITED STATES PATENTS

| | | |
|---|---|---|
| 2,134,716 | Gunn | Nov. 1, 1938 |
| 2,198,113 | Holmes | Apr. 23, 1940 |
| 2,248,727 | Strobel | July 8, 1941 |
| 2,421,016 | Deloraine et al. | May 27, 1947 |
| 2,489,273 | Dodington | Nov. 29, 1949 |
| 2,896,204 | Gille | July 21, 1959 |

FOREIGN PATENTS

| | | |
|---|---|---|
| 593,539 | Great Britain | Oct. 20, 1947 |

OTHER REFERENCES

Electronics, June 1956, pp. 143–145.